(12) United States Patent
Majumder et al.

(10) Patent No.: US 9,218,061 B2
(45) Date of Patent: Dec. 22, 2015

(54) VIDEO FRAME SYNCHRONIZATION FOR A FEDERATION OF PROJECTORS USING CAMERA FEEDBACK

(75) Inventors: Aditi Majumder, Irvine, CA (US); Fadi Kurdahi, Irvine, CA (US); Kiarash Amiri, Irvine, CA (US); Magda El Zarki, Irvine, CA (US); Shih-Hsien Yang, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 802 days.

(21) Appl. No.: 13/528,675

(22) Filed: Jun. 20, 2012

(65) Prior Publication Data

US 2012/0320200 A1 Dec. 20, 2012

Related U.S. Application Data

(60) Provisional application No. 61/499,055, filed on Jun. 20, 2011.

(51) Int. Cl.
*H04N 9/475* (2006.01)
*H04N 17/04* (2006.01)
*H04N 5/66* (2006.01)
*G06F 3/01* (2006.01)
*H04N 9/31* (2006.01)

(52) U.S. Cl.
CPC ............. *G06F 3/017* (2013.01); *H04N 9/3147* (2013.01)

(58) Field of Classification Search
CPC ............................... H04N 9/3147; G06F 3/017

USPC ......................................................... 348/143
See application file for complete search history.

(56) References Cited

U.S. PATENT DOCUMENTS

| | | | |
|---|---|---|---|
| 7,038,727 B2 | 5/2006 | Majumder | |
| 2007/0291233 A1* | 12/2007 | Culbertson et al. | 353/34 |
| 2008/0043209 A1* | 2/2008 | Widdowson et al. | 353/94 |
| 2008/0100805 A1* | 5/2008 | Majumder et al. | 353/30 |

OTHER PUBLICATIONS

Leopard imaging inc. leopardboard 365 3m camera board. http://www.leopardimaging.com.
Rakon tcxo products for mobile applications. http://www.rakon.com/Products/Pages/TCXOs.aspx.
Texas instruments dlp pico projector development kit. http://www.ti.com/tool/dlp1picokit.
Texas instruments dlp1700 specifications. http://http://www.ti.com/product/dlp1700.
beagleboard.org. Beagleboard-xm. http://www.beagleboard.org.
E. Bhasker, P. Sinha, and A. Majumder. Asynchronous distributed calibration for scalable reconfigurable multi-projector displays. IEEE Transactions on Visualization and Computer Graphics (Visualization), 2006.
H. Chen, R. Sukthankar, G. Wallace, and K. Li. Scalable alignment of large-format multi-projector displays using camera homography trees. Proc. of IEEE Vis, 2002.

(Continued)

*Primary Examiner* — Tat Chio
*Assistant Examiner* — Nguyen Truong
(74) *Attorney, Agent, or Firm* — Shimokaji IP (57) ABSTRACT

A method of audio and video synchronization may include capturing an image by each of a plurality of cameras. The images and audio may be compared with each other for synchronization.

18 Claims, 8 Drawing Sheets

(56) References Cited

OTHER PUBLICATIONS

S. Eilemann, M. Makhinya, and R. Pajarola. Equalizer: A scalable parallel rendering framework. IEEE Transactions on Visualization and Computer Graphics, 2009.
A. Fai. Projected display shared workspaces. US Patent Application 20110197147, 2010.
G. Humphreys, I. Buck, M. Eldridge, and P. Hanrahan. Distributed rendering for scalable displays. Proceedings of IEEE Supercomputing, 2000.
G. Humphreys, M. Eldridge, I. Buck, G. Stoll, M. Everett, and P. Hanrahan. Wiregl: A scalable graphics system for clusters. Proceedings of ACM SIGGRAPH, 2001.
G. Humphreys, M. Houston, R. Ng, R. Frank, S. Ahem, P. Kirchner, and J. Klosowski. Chromium : A stream processing framework for interactive rendering on clusters. ACM Transactions on Graphics (SIGGRAPH), 2002.
iSuppli Market Intelligence. Huge growth set for pico projectors in cell phones, other mobile electronics. http://www.isuppli.com.
A. Majumder, Z. He, H. Towles, and G. Welch. Achieving color uniformity across multi-projector displays. Proceedings of IEEE Vis, 2000.
A. Majumder and R. Stevens. Color nonuniformity in projection-based displays: Analysis and solutions. IEEE Transactions on Vis and Computer Graphics, 10(2), Mar.-Apr. 2003.
A. Majumder and R. Stevens. Perceptual photometric seamlessness in tiled projection-based displays. ACM TOG, 2005.
Optoma. Optoma pico projectors. http://www.optomausa.com/productcategory.asp.
J. Purcher. Apple reveals big plans to integrate projectors into ios devices. http://www.patentlyapple.com/patently-apple/2011/08/apple-reveals-big-plans-to-integrate- projectors-into-ios-devices.html, Aug. 2011.
A. Raij, G. Gill, A. Majumder, H. Towles, and H. Fuchs. Pixelflex 2: A comprehensive automatic casually aligned multi-projector display. IEEE PROCAMS, 2003.
A. Raij and M. Polleyfeys. Auto-calibration of multi-projector display walls. Proc. of ICPR, 2004.
R. Raskar. Immersive planar displays using roughly aligned projectors. In Proc. of IEEE VR, 2000.
R. Raskar, J. V. Baar, T. Willwacher, and S. Rao. Quadric transfer function for immersive curved screen displays. Eurographics, 2004.
R. Raskar, M. Brown, R. Yang, W. Chen, H. Towles, B. Seales, and H. Fuchs. Multi projector displays using camera based registration. Proc. of IEEE Vis, 1999.
P. Roman, M. Lazarov, and A. Majumder. A saclable distributed paradigm for multi-user interaction with tiled rear projection display walls. IEEE Transactions on Visualization and Computer Graphics, 2010.
B. Sajadi, M. Lazarov, A. Majumder, and M. Gopi. Color seamlessness in multi-projector displays using constrained gamut morphing. IEEE Transactions on Visualization and Computer Graphics (TVCG), 2009.
B. Sajadi and A. Majumder. Markerless view-independent registration of multiple distorted projectors on vertically extruded surface using a single uncalibrated camera. IEEE Transactions on Visualization and Computer Graphics (TVCG), 2009.
B. Sajadi and A. Majumder. Scalable multi-view registration for multi-projector displays on vertically extruded surfaces. Proceedings of EuroVis, 2010.
P. Sinha, E. Bhasker, and A. Majumder. Mobile displays via distributed networked projector camera pairs. Projector Camera Systems Workshop, 2006.
R. Yang, D. Gotz, J. Hensley, H. Towles, and M. S. Brown. Pixelflex: A reconfigurable multi-projector display system. Proc. of IEEE Vis, 2001.
R. Yang, A. Majumder, and M. Brown. Camera based calibration techniques for seamless multi-projector displays. IEEE TVCG, 2005.

\* cited by examiner

VIDEO FRAME SYNCHRONIZATION FOR A FEDERATION OF PROJECTORS USING CAMERA FEEDBACK

CROSS-REFERENCE TO RELATED APPLICATIONS

This application claims the benefit of Provisional Application 61/499,055 filed Jun. 20, 2011.

STATEMENT OF GOVERNMENT INTEREST

The invention described herein was made in the performance of official duties by one or more employees of the University of California University system, under National Science Foundation contract NSF EAGER ECCS-1059764NSF, and the invention herein may be manufactured, practiced, used, and/or licensed by or for the government of the State of California without the payment of any royalties thereon or therefor. This invention was made with Government support under Grant No. 1059764, awarded by the National Science Foundation. The Government has certain rights in this invention.

BACKGROUND

The present invention relates to a tiled or superimposed (overlaid) projection-based display that may be embedded in mobile devices that may also be applicable to display walls and to multi-user interaction with tiled or superimposed projection-based display walls.

Few recent works address systems with multiple projectors and cameras. A few systems process images from a camera by a computer connected to each camera, but the systems utilize a centralized server that controls the system.

Accordingly there is a need for a scalable paradigm with a distributed/cooperative/collaborative system for multi-user interaction with tiled or superimposed projection-based display walls.

SUMMARY

According to one aspect of the present invention, a method of audio and video synchronization comprises capturing an image by a sensor attached to a device among a plurality of devices, wherein at least one of the plurality of devices has cellular phone, local area network, or wide area network connectivity and includes at least a projector, a sensor, and a computing device; projecting an image frame by each of the projectors of the plurality of devices, wherein the image frame projected by each of the projectors of the plurality of devices is tiled or superimposed, and has an encoded or explicit frame number; identifying a most lagging or most ahead projector based on a calculated frame difference for each of the plurality of devices, wherein the frame difference for each of the plurality of devices is based on the difference in frame number from the most lagging or most ahead projector; synchronizing the image frames projected by each of the projectors attached to the plurality of devices and synchronizing the audio of each of the plurality of devices by synchronizing the clocks of the devices by comparing the calculated frame difference for each of the plurality of devices; and stalling or advancing the image frames projected by each of the projectors attached to the plurality of devices by the calculated frame difference.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides video frame synchronization for a federation of projectors using camera feedback. The present invention uses visual feedback from cameras instead of feedback via message passing over the network, mobile, or local area.

Figure 1:
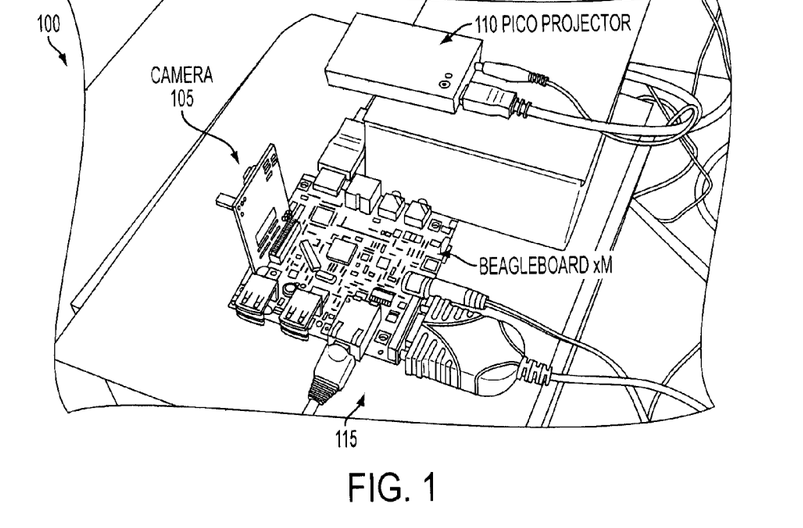
FIG. 1 shows a single pico-projector setup according to an exemplary embodiment of the invention.
Figure 2:
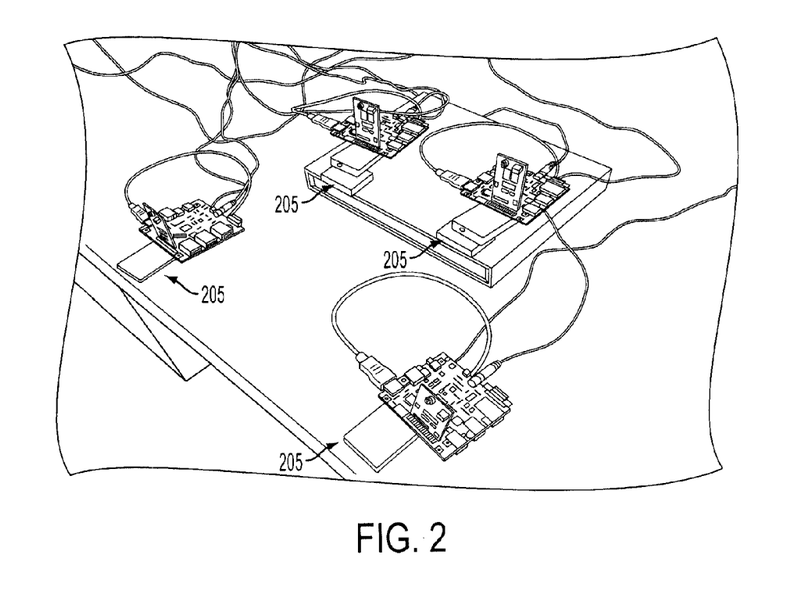
FIG. 2 shows four tiled pico-projectors according to an exemplary embodiment of the invention from FIG. 1.

Referring to FIG. 1, video frame synchronization 100 may include a system with a camera 105 facing a projection area, and a pico-projector 110 which faces a development board 115. Referring to FIG. 2, video frame-synchronization 100 from FIG. 1 may include a set 205 of multiple tiled pico-projectors. Video frame synchronization may use video or digital projectors.

Figure 3:
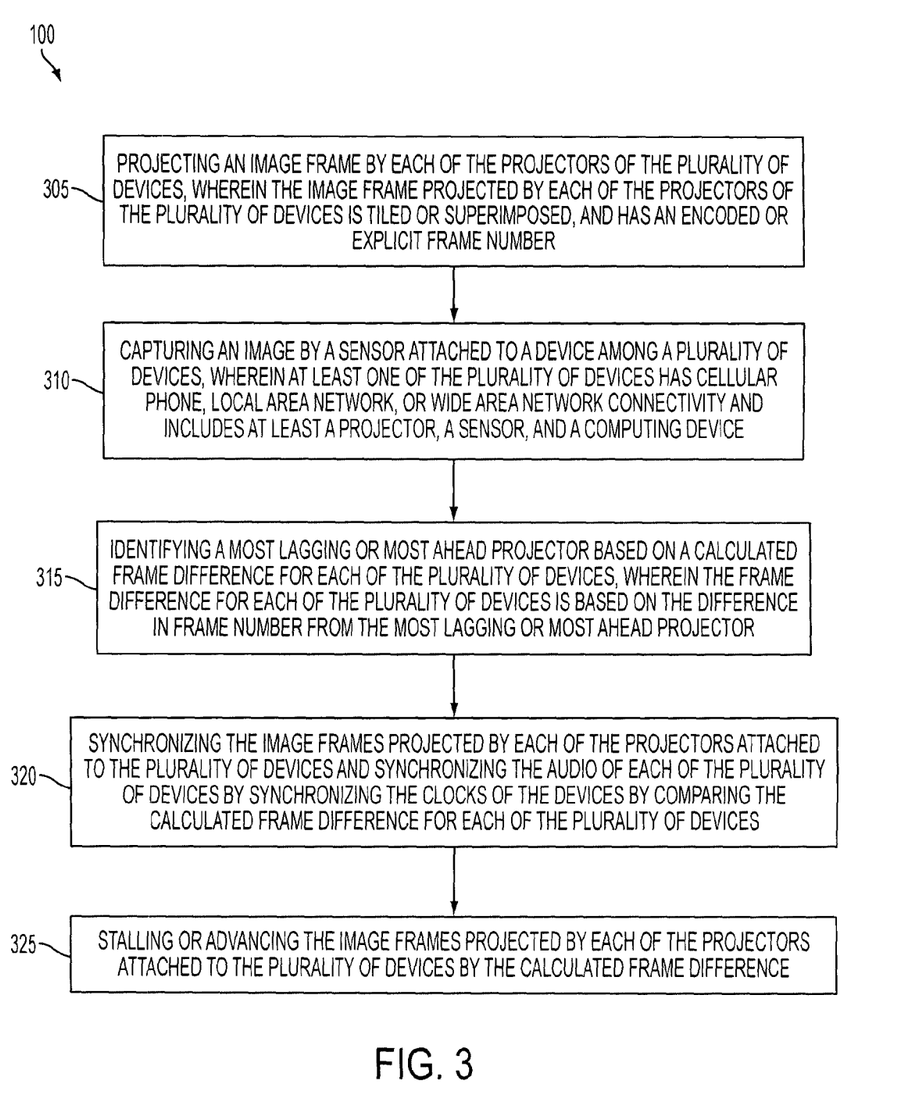
FIG. 3 shows a flowchart of distributed video frame synchronization according to an exemplary embodiment of the invention in FIG. 1.

Referring to FIG. 3, video frame synchronization 100 as shown in FIG. 1 may include a step 305 of projecting an image frame by each of the projectors of the plurality of devices, wherein the image frame projected by each of the projectors of the plurality of devices is tiled or superimposed, and has an encoded or explicit frame number. If the image projected by each of the projectors is tiled, the view of the camera may be larger than the projector for each of the devices. Therefore, the image captured by a sensor attached to a projector in a tiled configuration includes may include an area larger than the image projected by the projector. As an example, image frames projected by the projectors may be patterned codes such as Quick Response Codes (QR codes), but they may be other types of non-QR codes. In an exemplary embodiment, QR codes or other patterns encoding the frame numbers of the images projected by projectors from different devices may not overlap.

A step 310 may include capturing an image by a sensor attached to a device among a plurality of devices, such that at least one of the devices has cellular phone, local area network, or wide area network connectivity and includes at least a projector, a sensor, and a computing unit.

Each of the pico-projectors may be equipped with a camera covering an entire projected display. Displaying frames may occur at times internal to each projector. The display time of frames may be matched across multiple projectors. The next frames may be displayed based on a calculation based on a frame rate in each individual projector. The frame rate in each individual projector may be set based on an internal clock.

If the devices are in a superimposed configuration, the total display space of the area projected by the projectors of the plurality of devices may be divided into a number of discrete regions of at least the number of the plurality of devices. A pattern on one of the regions may be randomly projected by each of the projectors of the plurality of devices. Each of the plurality of devices may determine whether the pattern projected by itself overlaps with the pattern projected by another projector of another of the plurality of devices. One of the regions may be locked by keeping the pattern projected on the region being locked ON and marking the region being locked by the one of the plurality of devices projecting a pattern on the region being locked in response to determining that the pattern projected on the region being locked does not overlap a pattern projected by another of the plurality of devices. The region being locked may be marked as not taken and the pattern may be randomly re-projected on another region in response to determining that the pattern projected on the region being locked overlaps a pattern projected by another of the plurality of devices until each of the plurality of devices has locked one of the regions.

In an exemplary embodiment, audio and video synchronization may be performed at a granularity of a fraction of a frame. A frame display time of each of the plurality of devices may be calculated using a clock rate found on a respective one of the plurality of devices, such that the clock rate is different for each of the plurality of devices. In response to a spatial drift of synchronization, a pattern number may be embedded in the image frames in a way that is imperceptible to a viewer. In an exemplary embodiment, multiple devices may aggregate at least one of: power, audio quality, and video quality across the multiple devices.

Figure 4:
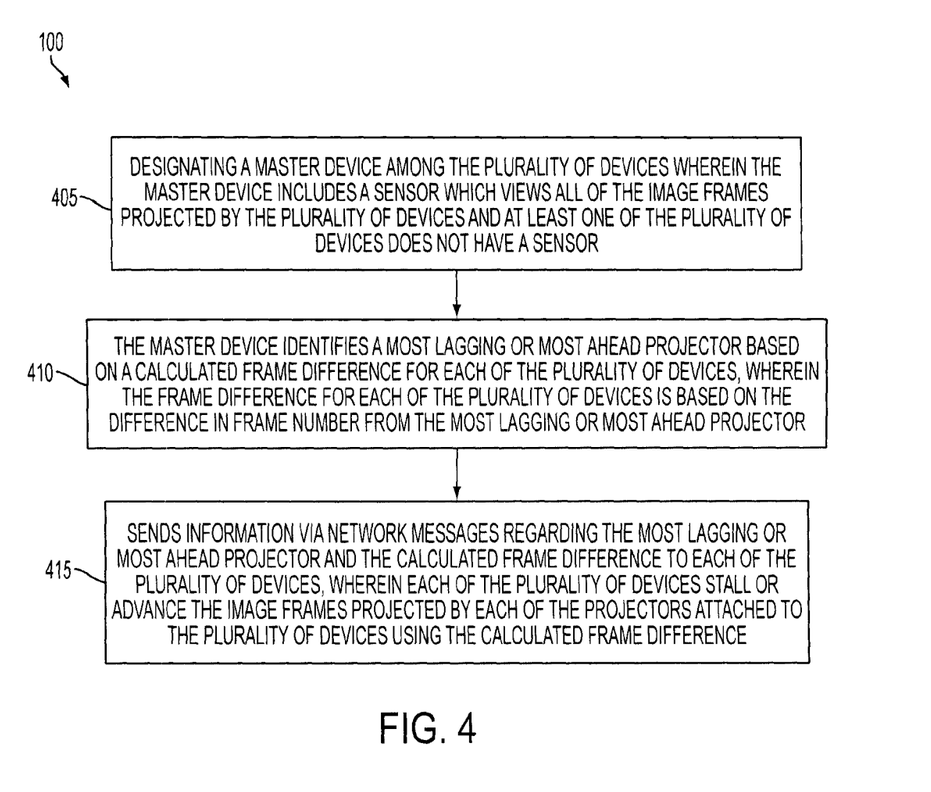
FIG. 4 shows a flowchart of centralized video frame synchronization according to an exemplary embodiment of FIG. 1.

A step 315 may include identifying a most lagging or most ahead projector based on a calculated frame difference for each of the plurality of devices, wherein the frame difference for each of the plurality of devices is based on the difference in frame number from the most lagging or most ahead projector. A step 320 may include synchronizing the image frames projected by each of the projectors attached to the plurality of devices and synchronizing the audio of each of the plurality of devices by synchronizing the clocks of the devices by comparing the calculated frame difference for each of the plurality of devices. A step 325 may include stalling or advancing the image frames by the calculated frame difference. For example, a most lagging projector may have the smallest frame number of the plurality of video or digital projectors. As an example, the image frame captured by a sensor attached to a projector that projects a tiled image may include an area greater than the image frame projected by the projector Referring to FIG. 4, centralized video frame synchronization 100 as shown in FIG. 1 may include a step 405 of designating a master device among the plurality of devices wherein the master device includes a sensor which may view all of the image frames projected by the plurality of devices and at least one of the plurality of devices may not have sensor. In an exemplary embodiment of the invention, video frame synchronization may include each of a plurality of projectors projecting a sequence of frames at a target frame rate. A step 410 may include identifying a most lagging or most ahead projector based on a calculated frame difference for each of the plurality of devices, wherein the frame difference for each of the plurality of devices is based on the difference in frame number from the most lagging or most ahead projector. A step 415 may include sending information via network messages regarding the most lagging or most ahead projector and the calculated frame difference to each of the plurality of devices, wherein each of the plurality of devices stall or advance the image frames projected by each of the projectors attached to the plurality of devices using the calculated frame difference. In one embodiment, a sensor from one of the plurality of devices may view less than all of the images projected by the devices. Each of the devices may perform independently of one another.

Figure 5:
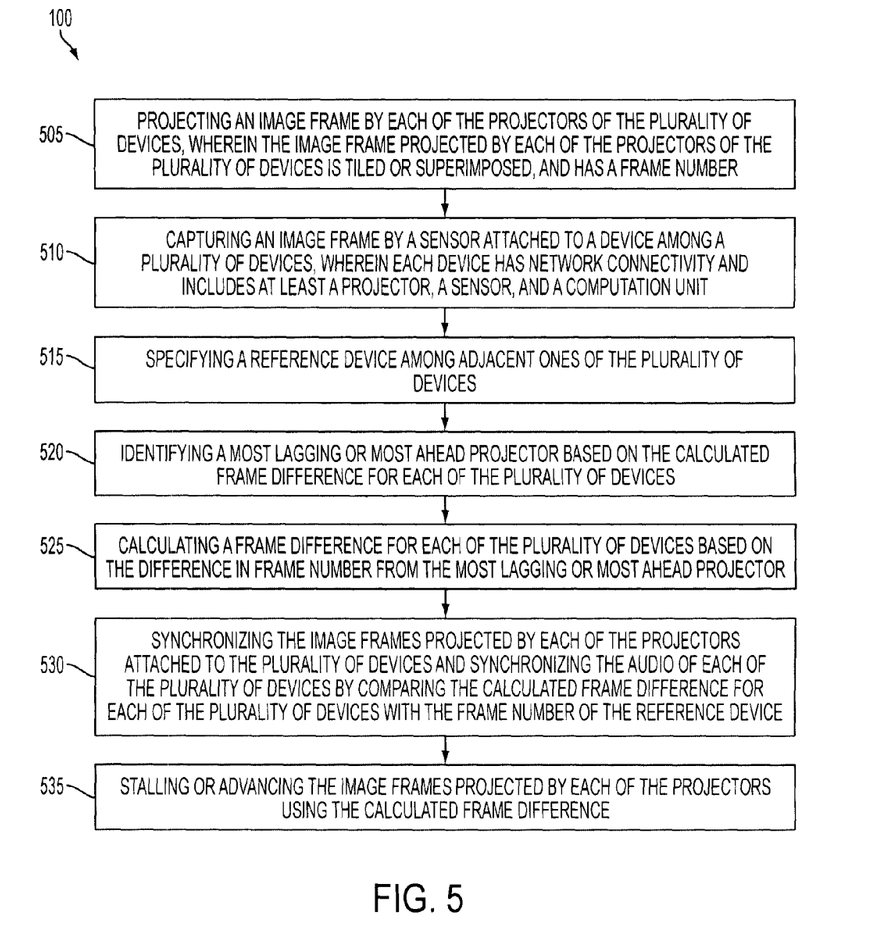
FIG. 5 illustrates a flowchart of distributed video frame synchronization according to an exemplary embodiment of FIG. 1.

Referring to FIG. 5, distributed video synchronization 100 as shown in FIG. 2 may include a step 505 of projecting an image frame by each of the projectors such that the image frame is tiled or superimposed, and has a frame number. A step 510 may include capturing an image frame by a sensor attached to one of the devices such that each of the devices has network connectivity and includes at least a projector, a sensor, and a computation unit.

A step 515 may include specifying a reference device among adjacent ones of the devices. In contrast to the above embodiment that uses a projector with maximum frame lag as a reference by the other projectors, this embodiment may use adjacent projectors as references. For example, a projector's camera may be positioned to view areas of projectors above, to the left, and above left, of the camera's current projection area.

A step 520 may include identifying a most lagging or most ahead projector based on the calculated frame difference for each of the plurality of devices. A most lagging or most ahead projector may be identified based on the calculated frame difference for each of the plurality of devices. The images projected by each of the projectors attached to the plurality of devices may be synchronized by comparing the calculated frame difference for each of the plurality of devices with the frame number of the reference device. In an exemplary embodiment if each device can see every other device via their cameras, then each device can synchronize the video and audio of the other devices by themselves. In an exemplary embodiment, if each device can only see adjacent devices, a reference device is chosen, and synchronization is done with respect to adjacent neighbors of the reference device. Then each of the devices adjacent to the reference device may chose themselves as the reference device and synchronize with devices adjacent to them until all the devices are synchronized.

A step 525 may include calculating a frame difference for each of the plurality of devices based on the difference in frame number from the most lagging or most ahead projector.

A step 530 may include synchronizing the image frames projected by each of the projectors attached to the devices and synchronizing the audio of each of the devices by comparing the calculated frame difference for the each of the devices with the frame number of the reference device.

A step 535 may include stalling or advancing the image frames projected by each of the projectors using the calculated frame difference. Synchronization may be re-executed using each of the devices adjacent to the reference device as the reference device. A flag may specify whether a projector has joined a set of projectors. Distributed synchronization may be performed in hierarchical stages between multiple groups of the projectors until all of the projectors in all adjacent groups are synchronized with one another.

In an exemplary embodiment, if the projectors project superimposed images, a total display space of the area projected by the projectors may be divided into a number of discrete UNLOCKED regions of at least the number of the devices. One of the devices may randomly project a pattern on one of the regions by one of the projectors from one of the devices. The regions other than where the devices have projected may be examined and if a region exists where non-overlapping patterns exist, a device ID may be decoded to mark these regions LOCKED by the respective devices. The region of the device's own projection may be examined to determine if its own pattern overlaps with the pattern projected by another projector. If the device's own pattern does not overlap a pattern projected by another device, the region the device is projecting on may be marked as LOCKED by keeping the pattern ON. If the device's own pattern overlaps a pattern projected by another device, another region may be chosen randomly and the device's own pattern may be re-projected until all of the devices have locked one region.

Figure 6:
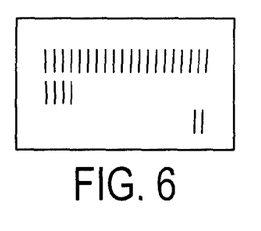
FIG. 6 shows a non-QR code pattern from a projector according to an exemplary embodiment of the invention shown in FIG. 2.

FIG. 6 shows a non-Quick Response coded pattern that may be projected from each of the projectors during a synchronization period. Any patterned code that can encode the information may be used. Patterns displayed on image frames may be integrated with code patterns from multiple devices.

Figure 7:
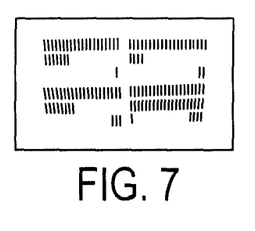
FIG. 7 shows the image of FIG. 6 with additional frames.

FIG. 7 shows the image of FIG. 5 with additional frames.

Figure 8:
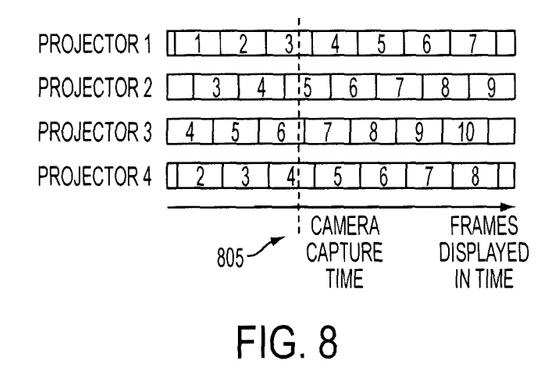
FIG. 8 illustrates frames displayed by out of synch projectors according to an exemplary embodiment of the invention shown in FIG. 2 with one capturing camera.

FIG. 8 illustrates frames being displayed at the same target frame rate by multiple out-of-synch projectors and one capturing camera. After projection has begun on the multiple out-of-synch projectors, a camera selected as a master unit may capture an image that contains the frames projected on all the video or digital projectors at an arbitrary time. At the time the master camera captures an image, projector 1 may display frame 3, projector 2 may display frame 5, projector 3 may display frame 6, and projector 4 may display frame 4. The first projector is shown with the highest lag in this case. The line shows the master camera capture time 805. The computed lags for projector 2, 3, and 4 are 2, 3, and 1 respectively.

Figure 9:
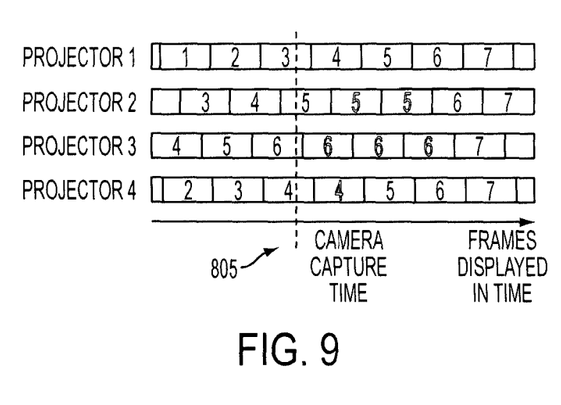
FIG. 9 illustrates synchronization after communication of a time lag by showing how projectors which are ahead stall their frames to synchronize according to an exemplary embodiment of the invention shown in FIG. 2 with one capturing camera.

FIG. 9 illustrates synchronization after communication of a time lag by showing how projectors which are ahead stall their frames to synchronize according to an exemplary embodiment of the invention shown in FIG. 2 with one capturing camera. After a lag is communicated, projector 2, 3, and 4 may stall for 2, 3, and 1 frames respectively. Thus, when displaying frame 7, all the projectors are synchronized.

Figure 10:
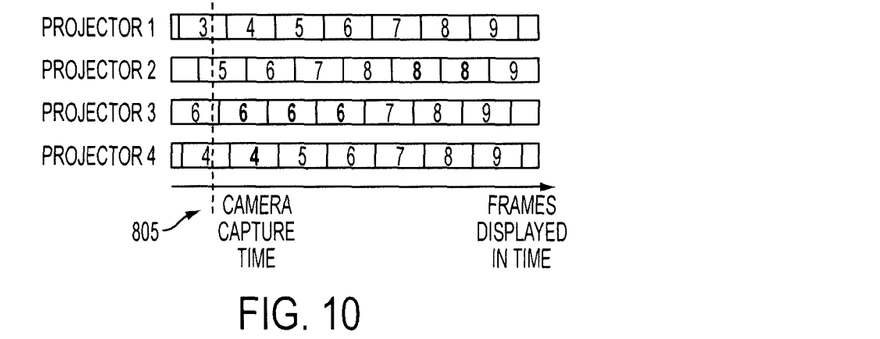
FIG. 10 illustrates a different order of synchronization from the exemplary embodiment of the invention in FIG. 9 with one capturing camera.

FIG. 10 illustrates a different order of synchronization from the exemplary embodiment of the invention in FIG. 9 with one capturing camera. If the message to projector 2 reaches 3 frames later due to network congestion, synchronization is achieved in frame 9 instead of frame 7.

Figure 11:
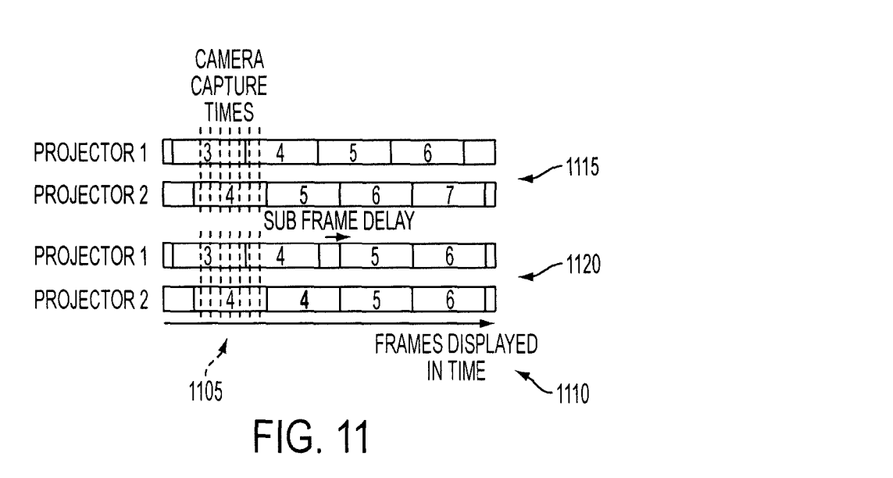
FIG. 11 illustrates increased image capture rate from a camera from the exemplary embodiment shown in FIG. 10.

FIG. 11 illustrates increased image capture rate from a camera from the exemplary embodiment shown in FIG. 10. FIG. 11 at the top two graphs 1115 illustrates camera capture times 1105 and the display time of frames 1110 without applying delays. FIG. 11 at the bottom two graphs 1120 illustrates projector 1 as a lagging projector at frame level with projector 2 stalled 1 frame.

Figure 12:
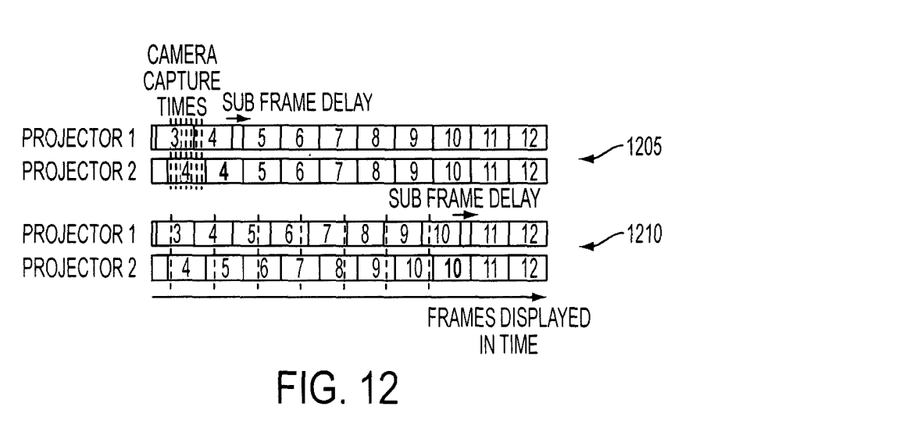
FIG. 12 illustrates how sub-frame granularity synchronization can be achieved using high speed cameras according to an exemplary embodiment of the invention shown in FIG. 2.

FIG. 12 illustrates how sub-frame granularity synchronization can be achieved using high speed cameras according to an exemplary embodiment of the invention shown in FIG. 2. FIG. 12 in the top two graphs 1205 illustrates sub-frame synchronization using a high speed camera capturing 7 frames in a display period of a projector. FIG. 12 in the bottom two graphs 1210 illustrates sub-frame synchronization using a low speed camera capturing 1 frame in each display period.

Figure 13:
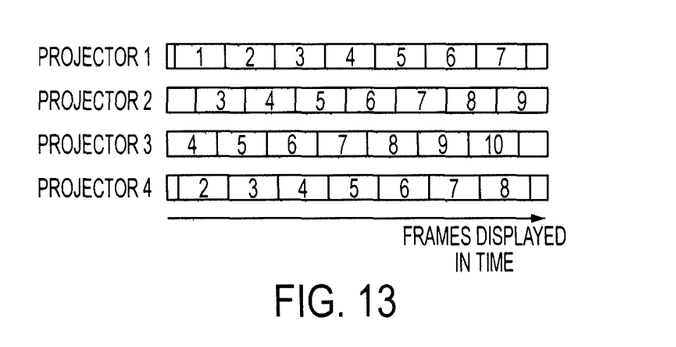
FIG. 13 also illustrates how sub-frame granularity synchronization can be achieved using high speed cameras according to an exemplary embodiment of the invention shown in FIG. 2.

FIG. 13 also illustrates how sub-frame granularity synchronization can be achieved using high speed cameras according to an exemplary embodiment of the invention shown in FIG. 2.

Figure 14:
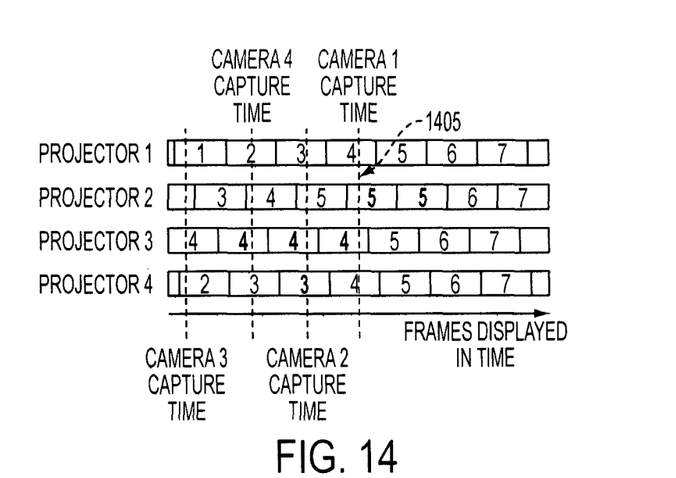
FIG. 14 illustrates synchronization of four projectors according to an exemplary embodiment of the invention shown in FIG. 2 with multiple cameras being used.

FIG. 14 illustrates synchronization of four projectors according to an exemplary embodiment of the invention shown in FIG. 2 with multiple cameras being used.

Figure 15:
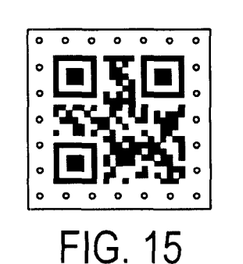
FIG. 15 shows the Quick Response code that a projector projects during synchronization and calibration of one or multiple tiled pico-projectors according to an exemplary embodiment of the invention shown in FIG. 2.

FIG. 15 shows the Quick Response code that a projector projects during synchronization and calibration of one or multiple tiled pico-projectors according to an exemplary embodiment of the invention shown in FIG. 2. As an example, codes other than Quick Response codes may be used.

Figure 16:
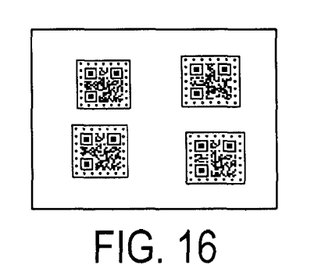
FIG. 16 shows images of Quick Response codes captured by a camera during synchronization according to an exemplary embodiment of the invention shown in FIG. 2.

FIG. 16 shows images of Quick Response codes captured by a camera during synchronization according to an exemplary embodiment of the invention shown in FIG. 2.

Figure 17:
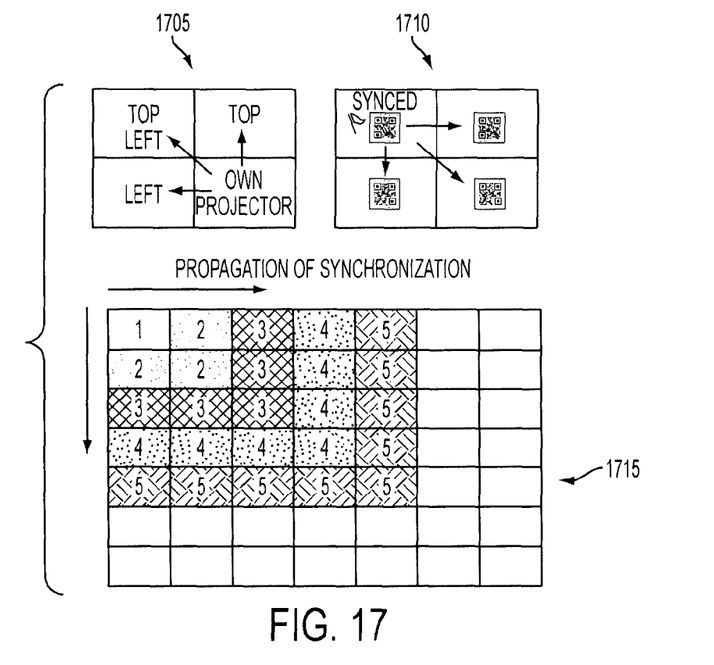
FIG. 17 illustrates propagation of synchronization according to an exemplary embodiment of the invention shown in FIG. 2.

FIG. 17 illustrates propagation of synchronization according to an exemplary embodiment of the invention shown in FIG. 2. FIG. 17 in the upper left 1705 illustrates that each camera accompanying a projector needs to cover the projection area of its own and the neighbors on top, left, and top left. FIG. 17 in the upper right 1710 illustrates that neighbors to the right, bottom, and bottom right of a projector can synch up with the projector. As shown at the bottom 1715 of FIG. 17, each set of projectors can find a reference from a previous set of projectors to synch up with. In an exemplary embodiment, the projectors may be synchronized using the reference device and those of the plurality of devices adjacent to the reference device. The synchronizing step may be re-executed using each of the devices adjacent to the reference device as a reference device until all of the devices are synchronized.

Figure 18:
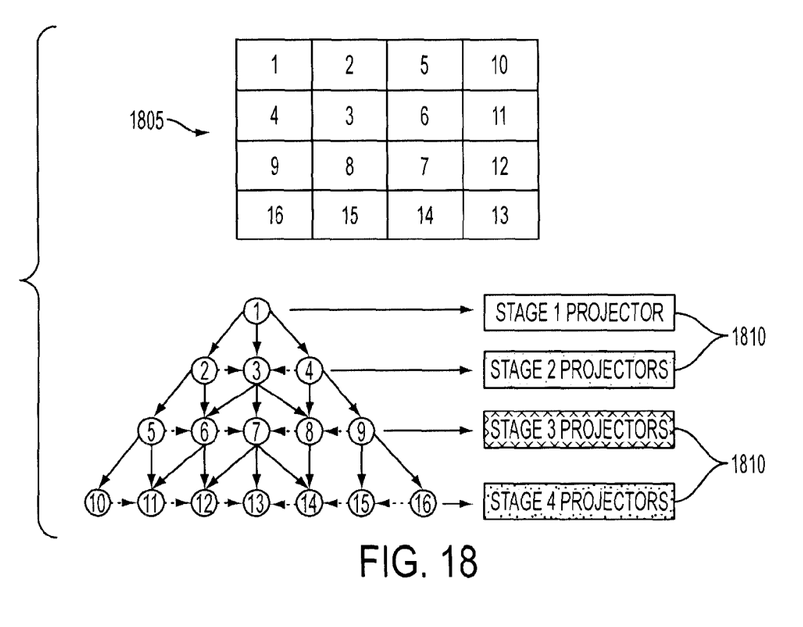
FIG. 18 illustrates synchronization paths for tiled projectors according to an exemplary embodiment of the invention shown in FIG. 2.

FIG. 18 illustrates synchronization paths for tiled projectors according to an exemplary embodiment of the invention shown in FIG. 2. FIG. 18 illustrates projector IDs 1805 for 16 tiled projectors. Synchronization paths for the 16 projectors are shown with four stage levels 1810. Avoiding horizontal paths may aid in avoiding synchronization error. Horizontal paths may be eliminated by forcing each projector to synchronize only with projectors in a stage above the projector.

It should be understood, of course, that the foregoing relates to exemplary embodiments of the invention and that modifications may be made without departing from the spirit and scope of the invention as set forth in the following claims.

What is claimed is:

1. A method of audio and video synchronization, the method comprising:
projecting an image frame by each of the projectors of the plurality of devices, wherein the image frame projected by each of the projectors of the plurality of devices is tiled or superimposed, and has an encoded or explicit frame number;
capturing an image by a sensor attached to a device among a plurality of devices, wherein at least one of the plurality of devices has cellular phone, local area network, or wide area network connectivity and includes at least a projector, a sensor, and a computing device;
identifying a most lagging or most ahead projector, in terms of time, based on a calculated frame display time difference for each of the plurality of devices, wherein the frame display time difference for each of the plurality of devices is based on the difference in frame number from the most lagging or most ahead projector, wherein the frame display time is representative of a time at which a respective image frame is displayed relative to other image frames;
synchronizing the frame display time for image frames projected by each of the projectors attached to the plurality of devices and synchronizing the audio of each of the plurality of devices by synchronizing the clocks of the devices by comparing the calculated frame display time difference for each of the plurality of devices; and
stalling or advancing the frame display time for image frames projected by at least one of the projectors attached to the plurality of devices by the calculated frame display time difference.

2. The method of claim 1, wherein the image frame captured by a sensor attached to a first projector that projects a tiled image includes an area greater than the image frame projected by the first projector.

3. The method of claim 1, wherein a plurality of patterns encoding the frame numbers of the images projected by the projectors of the plurality of devices do not overlap.

4. The method of claim 1, including:
determining that the projectors of the plurality of devices project superimposed images;
dividing a total display space of the area projected by the projectors of the plurality of devices into a number of discrete UNLOCKED regions of at least the number of the plurality of devices;
randomly projecting a pattern on one of the regions by one of the projectors of the plurality of devices;
examining the regions other than where the one of the plurality of devices has projected and if a region exists where non-overlapping patterns exist, decoding a device ID to mark these regions LOCKED by the respective devices;
examining the region of the one of the plurality of devices' own projection to determine if its own pattern overlaps with the pattern projected by another projector of another of the plurality of devices;
if the one of the plurality of devices' own pattern does not overlap a pattern projected by another of the plurality of devices, marking the region the one of the plurality of devices is projecting on as LOCKED by keeping the pattern ON; and
if the one of the plurality of devices own pattern overlaps a pattern projected by another of the plurality of devices, choosing another region randomly and re-projecting the one of the plurality of devices' own pattern until all the plurality of devices have locked one region.

5. The method of claim 1, including audio and video synchronization at a granularity of a fraction of a frame.

6. The method of claim 1, wherein a frame display time of each of the plurality of devices is calculated using a clock rate found on a respective one of the plurality of devices, wherein the clock rate is different for each of the plurality of devices.

7. The method of claim 1, including imperceptibly embedding a pattern number in the image frames of the projected images in response to a spatial drift of the synchronizing step.

8. The method of claim 1, wherein the plurality of devices aggregate at least one of: power, audio quality, and video quality across multiple ones of the plurality of devices.

9. The method of claim 1, including:
designating a master device among the plurality of devices wherein the master device includes a sensor which views all of the image frames projected by the plurality of devices and at least one of the plurality of devices does not have a sensor, and wherein the master device:
identifies a most lagging or most ahead projector based on a calculated frame difference for each of the plurality of devices, wherein the frame difference for each of the plurality of devices is based on the difference in frame number from the most lagging or most ahead projector; and
sends information via network messages regarding the most lagging or most ahead projector and the calculated frame difference to each of the plurality of devices, wherein each of the plurality of devices stall or advance the image frames projected by each of the projectors attached to the plurality of devices using the calculated frame difference.

10. The method of claim 9, wherein the image frames projected by the projectors of the plurality of devices are patterned codes.

11. The method of claim 9, wherein patterns displayed on the image frames are integrated with code patterns from multiple ones of the plurality of devices.

12. The method of claim 9, including imperceptibly embedding a pattern number in the image frames of the projected images in response to a spatial drift of the synchronizing step.

13. The method of claim 9, wherein the plurality of devices aggregate at least one of: power, audio quality, and video quality across multiple ones of the plurality of devices.

14. The method of claim 1, wherein each of the plurality of devices has a sensor which views less than all of the images projected by the plurality of devices and each of the devices performs the method of claim 1 independently of one another.

15. The method of claim 14, including:
choosing one of the plurality of devices as a reference device;
executing the synchronizing step using the reference device and those of the plurality of devices adjacent to the reference device;
re-executing the synchronizing step using each of the plurality of devices adjacent to the reference device as the reference device until all of the plurality of devices have completed the synchronizing step.

16. The method of claim 15, including imperceptibly embedding a pattern number in the image frames of the projected images in response to a spatial drift of the synchronizing step.

17. The method of claim 15, wherein the plurality of devices aggregate at least one of: power, audio quality, and video quality across multiple ones of the plurality of devices.

18. A method of audio and video synchronization, the method comprising:

projecting an image frame by each of the projectors of the plurality of devices, wherein the image frame projected by each of the projectors of the plurality of devices is tiled or superimposed, and has an encoded or explicit frame number;

capturing an image by a sensor attached to a device among a plurality of devices, wherein at least one of the plurality of devices has cellular phone, local area network, or wide area network connectivity and includes at least a projector, a sensor, and a computing device;

identifying a most lagging or most ahead projector, in terms of time, based on a calculated frame display time difference for each of the plurality of devices, wherein the frame display time difference for each of the plurality of devices is based on the difference in frame number from the most lagging or most ahead projector, wherein the frame display time is representative of a time at which a respective image frame is displayed relative to other image frames;

synchronizing the frame display time for image frames projected by each of the projectors attached to the plurality of devices and synchronizing the audio of each of the plurality of devices by synchronizing the clocks of the devices by comparing the calculated frame display time difference for each of the plurality of devices;

stalling or advancing the frame display time for image frames projected by at least one of the projectors attached to the plurality of devices by the calculated frame display time difference determining that the projectors of the plurality of devices project superimposed images;

dividing a total display space of the area projected by the projectors of the plurality of devices into a number of discrete UNLOCKED regions of at least the number of the plurality of devices;

randomly projecting a pattern on one of the regions by one of the projectors of the plurality of devices;

examining the regions other than where the one of the plurality of devices has projected and if a region exists where non-overlapping patterns exist, decoding a device ID to mark these regions LOCKED by the respective devices;

examining the region of the one of the plurality of devices' own projection to determine if its own pattern overlaps with the pattern projected by another projector of another of the plurality of devices;

if the one of the plurality of devices' own pattern does not overlap a pattern projected by another of the plurality of devices, marking the region the one of the plurality of devices is projecting on as LOCKED by keeping the pattern ON; and if the one of the plurality of devices own pattern overlaps a pattern projected by another of the plurality of devices, choosing another region randomly and re-projecting the one of the plurality of devices' own pattern until all the plurality of devices have locked one region.

* * * * *